United States Patent [19]
Lueghamer

[11] Patent Number: 5,921,587
[45] Date of Patent: Jul. 13, 1999

[54] FUSION JOINTING OF PLASTIC PIPES

[75] Inventor: Albert Lueghamer, Bad Hall, Austria

[73] Assignee: Alois Gruber Ges.m.b.H., Bad Hall, Austria

[21] Appl. No.: 08/495,003

[22] Filed: Jun. 27, 1995

[30] Foreign Application Priority Data

Jun. 27, 1994 [DE] Germany .............................. 44 22 372

[51] Int. Cl.$^6$ ................................................. F16L 13/02
[52] U.S. Cl. ............................ 285/21.2; 285/23; 219/544; 219/552
[58] Field of Search ..................... 285/21.2, 23; 219/544, 219/552, 553

[56] References Cited

U.S. PATENT DOCUMENTS

| | | | |
|---|---|---|---|
| 2,813,960 | 11/1957 | Egle et al. | 219/544 X |
| 3,061,503 | 10/1962 | Gould et al. | 219/544 X |
| 4,375,591 | 3/1983 | Sturm | 219/544 |
| 4,634,844 | 1/1987 | Lodder et al. | 285/21.2 X |
| 4,842,305 | 6/1989 | Kistenich | 285/21.2 |
| 5,150,923 | 9/1992 | Ohya et al. | 285/21.2 |
| 5,182,440 | 1/1993 | Dufour et al. | 219/544 X |
| 5,255,943 | 10/1993 | Keller et al. | 285/21.2 |
| 5,320,697 | 6/1994 | Hegler et al. | 285/21.2 |
| 5,478,118 | 12/1995 | Barq et al. | 285/21.2 |
| 5,505,898 | 4/1996 | Goto et al. | 219/544 X |
| 5,532,459 | 7/1996 | Steinmetz | 285/22 X |

FOREIGN PATENT DOCUMENTS

| | | | |
|---|---|---|---|
| 4171392 | 6/1992 | Japan | 285/21 |
| 671117 | 4/1952 | United Kingdom | 219/544 |

*Primary Examiner*—Dave W. Arola
*Attorney, Agent, or Firm*—Nikaido, Marmelstein, Murray & Oram LLP

[57] ABSTRACT

A process for fusion jointing or joining of pipe sections includes the steps of covering planed ends of the pipe pieces with an electric socket. The electric socket has a heating device disposed therein, and a heating output of the socket is such that an effective butt-jointing occurs between the pipe pieces. A bellows can be placed within the pipes to prevent collapse thereof, and to improve an inner bead quality of the pipe parts.

12 Claims, 2 Drawing Sheets

FUSION JOINTING OF PLASTIC PIPES

BACKGROUND OF THE INVENTION

1. Field of the Invention

The invention relates to a method and apparatus for the fusion jointing or joining of pipe parts having a small diameter, and being made of a material such as polyvinylidene difluoride (PVDF). Pipes made of other plastics, such as polyvinylchloride (PVC), clean polyvinylchloride (CPVC), polyethylene (PE), polypropylene (PP), ethylene chlorotrifluoroethylene (ECTFE), perfluoroalkoxyalkane (PFA), polyether ester ketone (PEEK), polyphenylene sulphide (PPS) or the like can also be jointed to one another according to the invention.

2. Description of the Related Art

The use of so-called electric sockets in the fusion jointing of pipes made of high-density polyethylene (HDPE) is known in the art. In this operation, the axially aligned pipe parts to be fusion-jointed are linearly aligned, maintaining a certain gap at a butt joint into which a ring made of the same material as the pipe parts to be fusion jointed can also be inserted. The electric socket is arranged around the butt joint, and heated by means of the electric heating element held therein. This causes a softening of the plastic at the socket/pipe parts interface, and consequently a fusion jointing of socket and pipe parts. However, a smooth fusion jointing does not take place between the pipe parts along the pipe gap on the inner diameter of the pipe. The gap remains in practice and consequently contributes to a relatively pronounced disturbance of the flow which will occur in the jointed pipe parts during use. In addition, in many cases the electric heating element is exposed in the region of the pipe gap and is therefore subject to corrosion.

Until now, the technique described of fusion jointing in HPDE pipeline construction with comparatively large pipe diameters could not be used in the fusion jointing of PVDF pipeline systems with their relatively small diameters. In the case of PVDF pipes, owing to the small diameters mentioned and the associated small wall thicknesses, when the known electric-socket fusion jointing is used, the pipe parts tend to collapse when heated, which has the effect that a reliable, durable, reproducible fusion joint quality cannot be obtained.

SUMMARY OF THE INVENTION

An object of the invention is to provide a process of the type mentioned at the beginning by which electric-socket fusion jointing can be used successfully for the fusion jointing of in particular PVDF pipes and pipe-like attachment pieces made of such plastic. In addition, a socket is disclosed, by which the process according to the invention can be implemented.

This object is achieved according to the invention in that the plastics pipe parts to be fusion-jointed are butted against each other, and the plastics pipe parts are heated over a relatively wide region of the butt joint over a length of in each case about 0.2 to 1.0 times the pipe diameter, measured from the butt joint, by means of an electrically heated socket made of plastic and are fusion jointed to the latter, the direct or relatively narrow region of the butt joint being heated more intensely than the relatively wide region, so that there occurs not only the fusion jointing of the inner surface of the socket and the adjacent surface of the pipe parts but also a butt fusion jointing of the pipe parts along the butt joint.

The process according to the invention consequently provides for, inter alia, an intensified heating of the region of the butt joint of both pipe parts, it having to be ensured that the pipe parts are butted against each other, that is to say bear closely or flush against each other. Apart from the cylindrical fusion surface between socket inner wall and outer surface of the pipe parts covered by it, there is consequently also a fusion jointing over the pipe wall thickness. As a result, the heating element, whether provided in the form of a heating coil, a wire mesh or the like, is fully sheathed with plastic. Complete protection against corrosion is consequently ensured. The medium later flowing in the pipe consequently also cannot be contaminated by component parts of the heating coil.

According to the invention, it is further provided that a bellows is arranged inside the plastics pipe parts in the region of the butt joint, is subjected to a pressure of about 1 to 3 bar and, after solidifying of the softened plastic, is relieved and removed from the jointed plastics pipe.

This bellows which is provided in the case of the process according to the invention and, under increased pressure, bears against the inner wall of the pipe parts over at least the axial length of the socket prevents any escape of softened plastic into the pipe bore. This reliably avoids the formation of a disturbing inner bead. In addition, because it extends at least over the axial length of the socket, the bellows generally stabilizes the pipe parts to be jointed, and prevents any deformation of the thin-walled pipes. If the process parameters according to the invention are maintained, the conditions are consequently particularly well suited also for fusion-jointed PVDF pipes by means of electric sockets.

According to the invention, the bellows which is used is provided at both of its axial ends with in each case a ring of larger diameter than the bellows itself. These rings, which can be made of plastic, have slightly smaller diameters than the pipe parts to be fusion-jointed. With appropriate material selection for the rings, the bellows can be transported very easily to the fusion joint. Tetrafluoroethylene is suitable as the material for the rings of plastic.

The invention is also directed at an electrically heatable or electric socket for carrying out the process according to the invention, which has a heating element in the region of its inner wall.

The socket is characterized in that it has greater heating output in the region of the butt joint to be covered than in the two outer regions thereof. With the invention, increased heating output is introduced in the region of the butt surface of both pipe parts.

This results in the softening or melting of the pipe ends, as a result of which a butt fusion-jointing and continuous axial jointing of the two pipe parts occurs. This method of carrying out the invention additionally contributes achieving the goal of a corrosion-protected arrangement of the heating element.

A preferred embodiment of the invention is distinguished in that the heating element is a heating wire coil which is wound more closely in the region of the butt joint than at the two adjoining outer regions, thus having a smaller pitch in this region.

The heating element according to the invention may also be a heating grid or heating mesh, with wires or heating elements running radially with respect to the pipe parts being arranged closer together in the region of the butt joint to be covered than in the two outer regions. An increase in the heating output in the region of the butt joint can also take place by the heating wire diameter being thinner in the region of the butt joint than in the two outer regions. Finally, according to the invention, the goal of increased heating output can be achieved in that, with the same pitch of the heating coil over the socket, an additional heating wire coil is provided in the region of the butt joint.

BRIEF DESCRIPTION OF THE DRAWINGS

Further details, features and advantages of the invention emerge from the following description of preferred embodiments and with reference to the attached drawings, wherein.

DETAILED DESCRIPTION OF THE PREFERRED EMBODIMENTS

Figure 1:
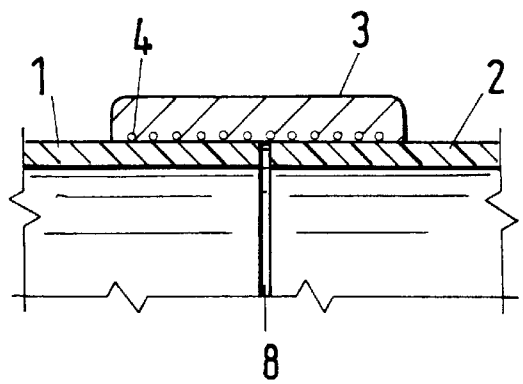
FIG. 1 shows a partial longitudinal section through two pipe parts to be fusion-jointed with a conventional electric socket according to the prior art.

FIG. 1 shows the prior art of the fusion jointing of two HDPE pipe parts 1 and 2, which are positioned one adjoining the other while maintaining a gap 8. An electric socket 3 has in the region of its inner surface a heating wire coil 4. If an electric current is sent through this coil, resistance heating occurs, with the consequence that the HDPE parts of the socket 3 and of the pipe parts 1 and 2 adjoining the heating wire coil 4 are incipiently melted, which results in a fusion-jointing of the pipe parts 1 and 2 respectively to the socket 3 upon cooling. In the case of the known process, however, the gap 8 is not filled, and the heating wire coil 4 remains partially open with respect to the pipe inner surface and is consequently subject to corrosion.

Figure 2:
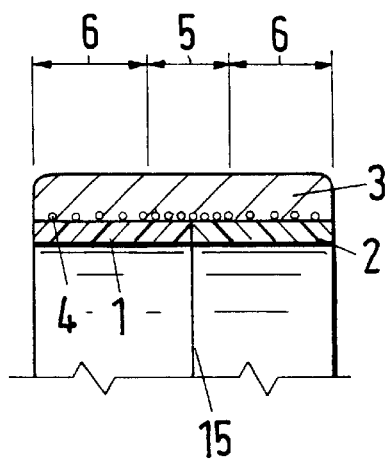
FIG. 2 shows the same view as FIG. 1 of an electric socket according to the invention with the pipe parts to be fusion-jointed.
Figure 3:
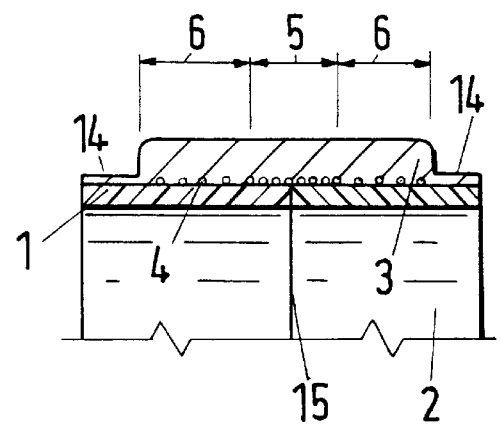
FIG. 3 shows a modified embodiment of the invention of FIG. 2.

The socket 3 according to the invention is particularly represented in FIGS. 2 and 3. In the case of the process according to the invention, the two pipe parts 1 and 2 are butted against each other, i.e. they bear against each other, as is indicated by the joint or butting surface 15.

The heating wire coil 4 is wound more closely in an inner region 5, which covers the joint 15, so that a more intense heat development occurs in this inner region upon heating the heating wire coil than in its two adjoining outer or relatively wide regions 6. The heating can be controlled or the arrangement of the coil windings can be made such that a complete softening of the pipe parts 1 and 2 occurs at the ends of the pipe parts 1 and 2 forming the joint 15, the two pipe parts 1 and 2 being butt-fusion-jointed to each other after cooling down, in addition to the fusion jointing by means of the electric socket 3 along the cylindrical bearing surface of socket 3 and pipe parts 1 and 2. Before the beginning of the heating or welding operation, a bellows 10 may also be introduced into the pipe bore, essentially into the region covered by the socket 3. It is subjected to pressure, preferably air pressure, at 1 to 3 bar and consequently on the one hand supports the entire pipe parts heated by the socket and consequently preserves the circular cross-sectional shape of the pipes, since the admission of pressure makes it bear closely against the inner wall of the pipe parts 1 and 2. In addition, it prevents any penetration of softened plastic into the pipe bore at the butt surface 15 of the two pipe parts 1 and 2, which at this point are softened throughout, i.e. extending through the pipe wall thickness, by the heating output intensified there according to the invention. In this way, the formation of an inner bead, disturbing for later operation, is also reliably suppressed.

After cooling down of the softened plastic parts between the inner wall of the socket 3 and outer wall of the pipe parts 1 and 2 and also along the butting surface extending radially at the butting surfaces 15 of the pipe parts 1 and 2, the bellows 10 is removed from the pipe bore after switching off the heating of the socket. The pipe parts 1 and 2 are fusion-jointed to each other to form a single pipe, their circular cross-sectional shape being precisely preserved and an inner bead and gap 8 being avoided.

Figure 4:
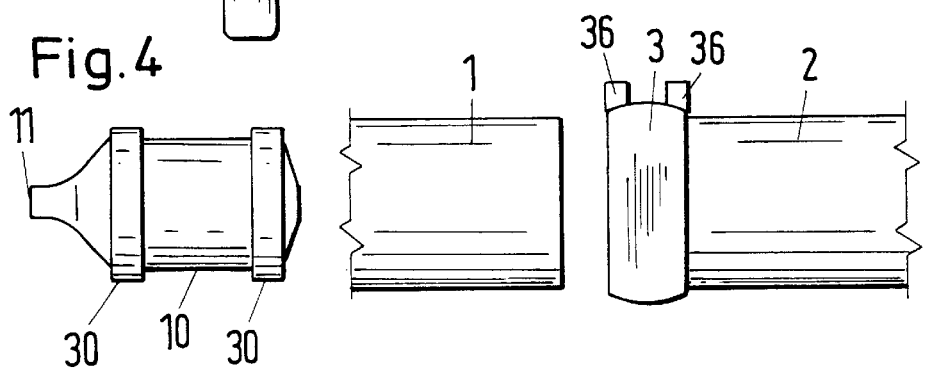
FIG. 4 shows a representation of the preparation of the process according to the invention.

As FIG. 4 reveals, the bellows 10 may also be surrounded in the region of its axial ends by rings of plastic, which preferably consist of polytetrafluoroethylene or a similar material which slides comparatively well in the pipe parts 1 and 2 to be fusion-jointed. The outside diameter of the rings of plastic 30 is slightly smaller than that of the pipe parts 1 and 2, into which the bellows 10 is to be pushed. The bellows 10 is arranged with respect to the butt joint 15 such that the rings of plastic 30 are arranged essentially symmetrically with respect to it. Then, the bellows 10 is subjected to pressure, it coming to bear along its part located between the rings of plastic 30 closely against the butt joint 15 and, during the actual fusion-jointing operation, reliably counteracting the formation of a fusion bead.

FIG. 4 shows a diagrammatic representation of the preparation for the fusion-jointing operation. The socket 3 has already been pushed onto the pipe part 2. The pipe part 1 is subsequently likewise pushed into the socket 3 from the side opposite the pipe parts 2, until it meets the pipe part 2 centrally in the socket. Both pipe ends are planed flat prior to the fusion jointing operation. Subsequently, the bellows 10 is introduced into the pipe bore under the socket 3. In the case of the exemplary embodiment drawn, the bellows extends over an axial length which is approximately two times greater than the socket 3 and consequently supports the fusion-jointing region of the socket and the adjoining regions of the pipe parts 1 and 2 reliably after pressure application. The pressure is supplied via a tube connection at the end 11.

Figure 5:
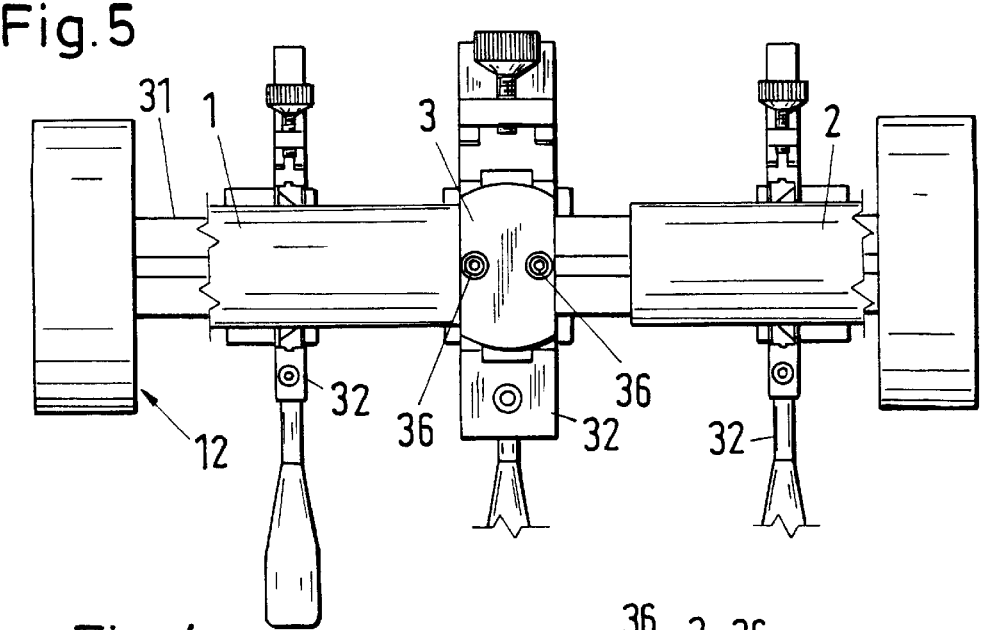
FIG. 5 shows a clamping device for carrying out the process according to the invention, in plan view.

FIG. 5 additionally illustrates a clamping device 12, in which the pipe parts 1 and 2 are clamped axially in line during the fusion-jointing operation. The bellows 10 is not shown in the case of this exemplary embodiment. The pipe part 2 still has to be introduced into the socket 3 by means of the clamping element 32 assigned to it.

The clamping device 12 basically comprises a rest 31, on which three clamping elements 32 are mounted displaceably and fixably. One clamping element 32 each serves for receiving the pipe part 1, the socket 3 and the pipe part 2. These component parts of the pipe to be fusion-jointed are respectively able to be aligned and fixed in the clamping elements 32 in line with one another, so that these elements are firmly arranged with respect to one another for the fusion-jointing operation.

In FIG. 3, a socket 3 corresponding to the socket 3 shown in FIG. 2 is represented. It differs from the socket 3 shown in FIG. 2 in that it is provided on both sides with socket attachments 14 and is consequently axially extended. Clamping device 12 can therefore be dispensed with in cases of pipe parts of small diameter. The socket attachments 14 help ensure that the pipe parts 1 and 2 are reliably secured and arranged in the actual socket 3 before the fusion-jointing, the jointing surfaces also in this case butting one against the other and then forming the joint 15.

Figure 6:
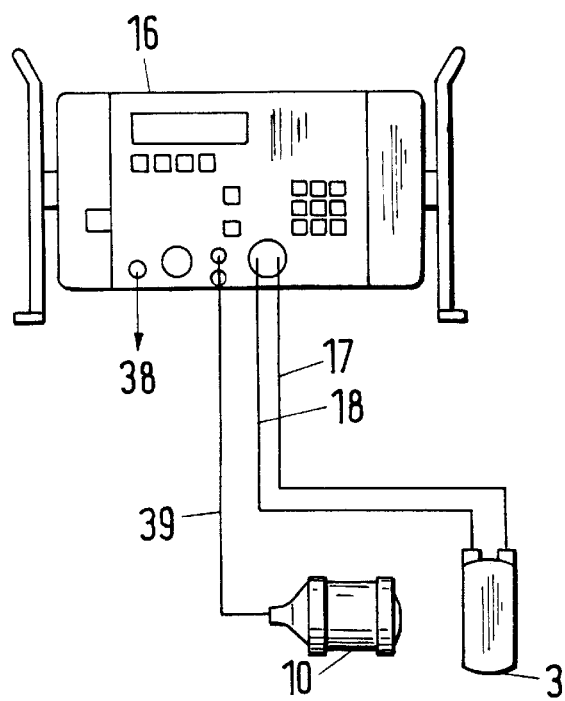
FIG. 6 illustrates fusion-jointing device for carrying out the process according to the invention.

In FIG. 6, a fusion-jointing generator 16 with bellows 10 and socket 3 for carrying out the process according to the invention is represented. The bellows 10 is connected via the fusion-jointing generator 16 to a compressed-air source 38 and is then supplied with controlled pressure, via a line 39, according to programming by means of a bar code to be read in. The socket 3 is connected via lines 17, 18 to the fusion-jointing generator 16 and is supplied from there with electric power.

The fusion-jointing generator is generally supplied with a voltage of 110 to 220 volts. It supplies a fusion-jointing current with a voltage of about 5 to 10 volts and a current intensity of about 4 to 5 amperes. Depending on the data which are stored in the bar code, which is supplied along with the pipes or the sockets, the fusion-jointed time and the fusion-jointed current are then automatically preset. Values concerning the manufacturer, dimensions of socket and pipe, wall thickness and the consequently required fusion-jointing time may be stored in the bar code.

The invention shows a way of fusion-jointing comparatively thin-walled pipes made of PVDF and also of other plastics to each other. The diameter of these pipes is generally about 20 to 160 mm. The wall thickness is about 1.9 to 10 mm. The wall thickness of the sockets described here amounts to about 3 to 10 mm, that of the socket attachments to about 1.5 mm. The axial extent of the socket attachments in the preferred case is about 7 to 8 mm. In cases of pipe diameters of 20 to 35 mm, the axial length of the socket according to the invention corresponds approximately to the pipe diameter; in cases of pipe diameters of about 35 to 160 mm, about 0.6 to 0.4 times the diameter. It follows from this that the sockets according to the invention have comparatively short axial lengths. In this way, it is possible to fusion-joint not only straight-extending pipes to each other, but also pipe elbows and fittings each other and/or to straight pipe sections.

Figure 7:
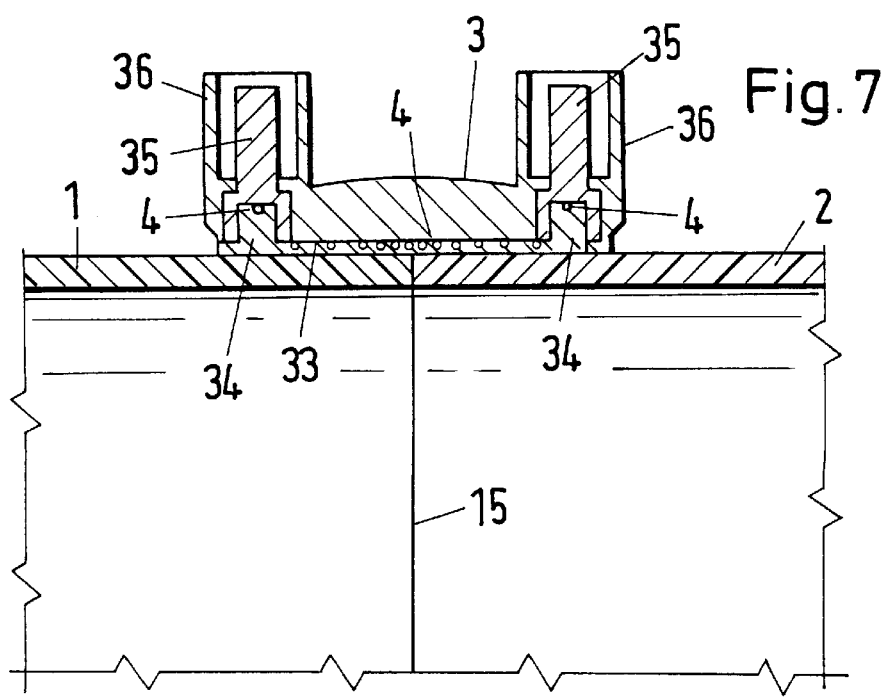
FIG. 7 shows the socket according to the invention as shown in FIG. 2, in an enlarged representation.

To illustrate the socket according to the invention, a preferred exemplary embodiment is once again represented, greatly enlarged, in FIG. 7. The two pipe parts 1 and 2, which are butted against each other along the butt joint 15, can be seen. The socket 3 is already provided symmetrically over the butt joint. FIG. 7 illustrates the pipe parts 1, 2 and the socket 3 in longitudinal section, only one half of this longitudinal section being represented, as can be seen. In the present case, the socket comprises a sleeve 33, on which the heating coil 4 is provided, to be precise in such a way that the winding spacings with respect to one another are smaller in the region of the butt joint 15 than in the two outer regions of the socket, so that in this region of the butt joint 15 to be covered there is in comparison with the outer regions an intensified heating output of the socket, which results also in the fusion-jointing of the butted-together end faces of the pipe parts 1 and 2 along the butt joint 15.

The sleeve 33 has in the region of its axial ends in each case an attachment 34, to which the two ends of the heating coil 4 are applied. Electric contact elements 35 are then fitted onto the attachments. These are operations in the production of the socket, which of course have to take place before the complete socket is arranged on the pipe parts 1 and 2. The contact elements 35 are connected to the lines 17, 18.

In the actual production operation of the socket 3, after arranging the heating coil 4 and the terminals 35 in the way described, the unit thus created is encapsulated in plastic in a further operation and a further mold, so that the final socket 3 is obtained in the form drawn. A connecting socket 36 is at the same time produced for each of the terminals 35.

It must further be emphasized that socket 3 which is particularly protected against contamination by the integrated heating coil 4 is obtained if, according to the invention, the heating wire from which the heating coil 4 is wound is coated with PFA before its integration into the socket 3, that is to say before the winding-up onto the sleeve 33, and if the actual socket 3, including the sleeve 33, is formed from PVDF. PFA has a somewhat higher melting point than PVDF. In the fusion-jointing operation, the sheathing of the heating wire is therefore softened less than the PVDF of the socket, so that any free material particles of the heating wire are held in the PFA sheathing. With such a socket, in an advantageous way, pipe parts 1, 2 made of PVDF are also fusion-jointed. It is sufficient if the PFA coating of the heating wire has a thickness of about 0.1 mm.

As evident from the foregoing description, a number of modifications not specifically disclosed herein could be made to the device, but still be within the intended scope of the invention. To determine the scope of the invention, therefore, reference should be made to the appended claims.

I claim:

1. A socket for fusion-jointing of plastic pipe parts, said socket comprising:

a housing having two ends, an outer surface and inner surface;

an electric heating element disposed in said housing adjacent the inner surface thereof, said heating element being configured to provide a higher heating output at a center region thereof between the two ends, adjacent a joint to be fused, than at outer regions thereof toward the two ends and disposed away from the joint to be fused.

2. A socket as recited in claim 1, wherein said electric heating element comprises a heating coil, said heating coil having a winding spacing which is smaller in the center region adjacent the butt joint to be fused than at the outer regions thereof.

3. A socket as recited in claim 1, wherein said electric heating element comprises a heating grid formed of a wire mesh, with wires of the mesh which are radially disposed with respect to pipe parts to be joined are closer together in the center region adjacent the joint to be fused than the outer regions thereof toward the two ends.

4. A socket as recited in claim 1 wherein the electric heating element comprises a coil having a constant pitch, wherein a diameter of heating wire forming the coil is thinner in the center region adjacent the joint to be fused than in outer regions thereof.

5. A socket according to claim 1, wherein said electric heating element comprises a first heating coil extending in an area between the two ends of the housing, with a second heating coil provided in the housing in the center region adjacent the joint to be fused.

6. A socket according to claim 1, wherein the housing has an axial length which is in a range of 0.2 to 1.00 times an inner diameter of one of the first and second pipe parts.

7. A socket according to claim 1, wherein the housing has an axial length which is approximately equal to an inner diameter of one of the first and second pipe parts.

8. A socket according to claim 1, wherein the housing has an axial length which is in a range of 0.4 to 0.6 times an inner diameter of one of the first and second pipe parts.

9. A socket according to claim 1, said socket further comprising holding means for holding the pipe parts to be fusion-jointed, said holding means being integrally attached to the at least two ends of the housing.

10. A socket according to claim 9, wherein said holding means comprises socket attachments attached to said two ends of the housing, said socket attachments having inner diameters which correspond to an inner diameter of the housing, said socket attachments having a wall thickness which is less than a wall thickness of the housing.

11. A socket as recited in claim 1, wherein said electric heating element is embedded within the socket housing.

12. A socket as recited in claim 1, wherein said electric heating element is disposed in the housing between the two ends thereof.

* * * * *